US009421648B2

(12) United States Patent
Yang et al.

(10) Patent No.: US 9,421,648 B2
(45) Date of Patent: *Aug. 23, 2016

(54) MANUFACTURING METHOD OF HEAT PIPE STRUCTURE

(71) Applicant: ASIA VITAL COMPONENTS CO., LTD., New Taipei (TW)

(72) Inventors: Hsiu-Wei Yang, New Taipei (TW); Fu-Kuei Chang, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 152 days.

This patent is subject to a terminal disclaimer.

(21) Appl. No.: 14/069,325

(22) Filed: Oct. 31, 2013

(65) Prior Publication Data

US 2015/0113807 A1    Apr. 30, 2015

(51) Int. Cl.
  *B23P 15/26* (2006.01)
  *F28D 15/04* (2006.01)
  *B21D 53/06* (2006.01)
  *F28D 15/02* (2006.01)

(52) U.S. Cl.
  CPC .......... *B23P 15/26* (2013.01); *F28D 15/0233* (2013.01); *F28D 15/046* (2013.01); *B21D 53/06* (2013.01); *B23P 2700/09* (2013.01); *Y10T 29/49353* (2015.01); *Y10T 29/49377* (2015.01); *Y10T 29/49391* (2015.01); *Y10T 29/49393* (2015.01)

(58) Field of Classification Search
  CPC ... B21D 53/02; B21D 53/06; B23P 2700/09; B23P 15/26; B32B 37/28; F28D 15/0233; F28D 15/04; F28D 15/046; F28D 2021/0028; F28D 9/005; F28D 13/003; F28D 13/185; F28D 2255/18; F28D 2275/04; F28D 2275/061; Y10T 29/49353; Y10T 29/49361; Y10T 29/49377; Y10T 29/49391; Y10T 29/49393

See application file for complete search history.

(56) References Cited

U.S. PATENT DOCUMENTS

| 3,680,189 | A  | * | 8/1972 | Noren ....................... 29/890.032 |
|---|---|---|---|---|
| 6,508,302 | B2 | * | 1/2003 | Ishida et al. ............. 165/104.26 |
| 6,863,118 | B1 | * | 3/2005 | Wang et al. ............. 165/104.26 |
| 7,159,647 | B2 | * | 1/2007 | Hsu ........................... 165/104.26 |
| 2004/0135510 | A1 | * | 7/2004 | Bewlay et al. ............... 313/624 |
| 2005/0126779 | A1 | * | 6/2005 | Arterbury ..................... 166/278 |

(Continued)

FOREIGN PATENT DOCUMENTS

| CN | 201569344 U | 9/2010 |
|---|---|---|
| CN | 202092499 U | 12/2011 |

(Continued)

*Primary Examiner* — Ryan J Walters
*Assistant Examiner* — Matthew P Travers
(74) *Attorney, Agent, or Firm* — C. G. Mersereau; Nikolai & Mersereau, P.A.

(57) ABSTRACT

A heat pipe structure and a manufacturing method of the heat pipe structure. The heat pipe structure includes a tubular body and a mesh body. The tubular body has a chamber. The chamber has a first side and a second side. A working fluid is contained in the chamber. The wall faces of the first and second sides are respectively formed with a first channel set and a second channel set. A first contact section and a second contact section are respectively formed at the junctions between the first and second channel sets and the wall faces of the first and second sides. The mesh body is disposed in the chamber and attached to the first and second contact sections. Accordingly, the thickness of the heat pipe is greatly reduced and the manufacturing cost of the heat pipe is lowered.

5 Claims, 6 Drawing Sheets

(56) References Cited

U.S. PATENT DOCUMENTS

| | | | |
|---|---|---|---|
| 2005/0269064 A1* | 12/2005 | Hsu | 165/104.26 |
| 2006/0162906 A1* | 7/2006 | Hong et al. | 165/104.26 |
| 2006/0174484 A1* | 8/2006 | Chuang et al. | 29/890.032 |
| 2006/0213061 A1* | 9/2006 | Wu et al. | 29/890.032 |
| 2006/0225282 A1* | 10/2006 | Chung | 29/890.032 |
| 2007/0267178 A1* | 11/2007 | Hou et al. | 165/104.26 |
| 2008/0185128 A1* | 8/2008 | Moon et al. | 165/104.26 |
| 2009/0173475 A1* | 7/2009 | Hsiao et al. | 165/104.33 |
| 2009/0184624 A1* | 7/2009 | Schmidt | C09K 11/7774 313/498 |
| 2009/0308576 A1* | 12/2009 | Wang et al. | 165/104.26 |
| 2010/0146922 A1* | 6/2010 | Greenwood | B01D 39/083 55/523 |
| 2010/0319882 A1* | 12/2010 | Lee et al. | 165/104.26 |
| 2011/0009233 A1* | 1/2011 | Mizuno | F16H 57/082 475/331 |
| 2011/0314674 A1* | 12/2011 | Yang | 29/890.032 |
| 2012/0047984 A1* | 3/2012 | Huang et al. | 72/364 |
| 2012/0080170 A1* | 4/2012 | Yang | 165/104.26 |
| 2012/0180994 A1* | 7/2012 | Yang et al. | 165/104.26 |
| 2012/0180995 A1* | 7/2012 | Yang et al. | 165/104.26 |
| 2012/0227933 A1* | 9/2012 | Chen et al. | 165/104.21 |
| 2012/0227934 A1* | 9/2012 | Huang | 165/104.26 |
| 2013/0043004 A1* | 2/2013 | Wang et al. | 165/104.21 |
| 2014/0060781 A1* | 3/2014 | Jia et al. | 165/104.26 |

FOREIGN PATENT DOCUMENTS

| | | |
|---|---|---|
| CN | 101581548 B | 2/2012 |
| CN | 202254982 U | 5/2012 |
| CN | 102538528 B | 10/2013 |
| TW | M264482 U | 5/2005 |
| TW | 200835898 A | 9/2008 |
| TW | 201245651 A1 | 11/2012 |
| TW | 201317462 A | 5/2013 |
| TW | M470892 U | 1/2014 |

* cited by examiner

MANUFACTURING METHOD OF HEAT PIPE STRUCTURE

BACKGROUND OF THE INVENTION

1. Field of the Invention

The present invention relates generally to a manufacturing method of a heat pipe structure, and more particularly to a thinner heat pipe structure manufactured at lower cost and a manufacturing method of the heat pipe structure.

2. Description of the Related Art

A heat pipe has heat conductivity several times to several tens times that of copper, aluminum or the like. Therefore, the heat pipe has excellent performance and serves as a cooling component applied to various electronic devices. As to the configuration, the conventional heat pipes can be classified into heat pipes in the form of circular tubes and heat pipes in the form of flat plates. For cooling an electronic component such as a CPU, preferably a flat-plate heat pipe or thin heat pipe is used in view of easy installation and larger contact area. To catch up the trend toward miniaturization of cooling mechanism, the heat pipe has become thinner and thinner in adaptation to the cooling mechanism.

The heat pipe is formed with an internal space (chamber) as a flow path for the working fluid contained in the heat pipe. The working fluid is converted between liquid phase and vapor phase through evaporation and condensation and is transferable within the heat pipe for transferring heat. The heat pipe is formed with a sealed void (chamber) in which the working fluid is contained.

The heat pipe is used as a remote end heat conduction member. The heat pipe is fitted through a radiating fin assembly. The working fluid with low boiling point is filled in the heat pipe. The working fluid absorbs heat from a heat-generating electronic component (at the evaporation end) and evaporates into vapor. The vapor working fluid goes to the radiating fin assembly and transfers the heat to the radiating fin assembly (at the condensation end). A cooling fan then carries away the heat to dissipate the heat generated by the electronic component.

The heat pipe is manufactured in such a manner that metal powder is filled into a hollow tubular body by means of a mandrel of a tool. Then the metal powder is sintered to form a capillary structure layer on the inner wall face of the tubular body. Then the tubular body is vacuumed and filled with the working fluid and then sealed. Alternatively, a mesh capillary structure body is placed into a tubular body and sintered to form a capillary structure layer on the inner wall face of the tubular body. Then the tubular body is vacuumed and filled with the working fluid and then sealed. On the demand of the electronic equipment for slim configuration, the heat pipe must be made with the form of a thin plate.

In the conventional technique, the heat pipe is flattened into a flat-plate form to meet the requirement of thinning. After the metal powder is filled into the tubular body and sintered, the tubular body is flattened into a flat plate. Then the flat plate is filled with the working fluid and finally sealed. Alternatively, the tubular body is first flattened into a flat plate. Then the metal powder is filled into the tubular body and sintered. However, after flattened, the internal chamber of the flat plate is extremely narrow. Under such circumstance, it is quite hard to fill the metal powder into the chamber. Moreover, the capillary structure in the heat pipe must provide both support force and capillary attraction for the heat pipe. In such a narrow space, the effect provided by the capillary structure is limited.

Furthermore, the vapor passage inside the heat pipe is so narrow that the vapor-liquid circulation is affected.

According to the above, the conventional technique has the following shortcomings:
1. It is quite hard to process the thin heat pipe.
2. The capillary structure in the heat pipe is likely to be damaged.
3. The manufacturing cost of the thin heat pipe is relatively high.

SUMMARY OF THE INVENTION

It is therefore a primary object of the present invention to provide a thinner heat pipe structure manufactured at lower cost.

It is a further object of the present invention to provide a manufacturing method of a thinner heat pipe structure to lower the manufacturing cost of the heat pipe structure.

To achieve the above and other objects, the heat pipe structure of the present invention includes a tubular body and a mesh body.

The tubular body has a chamber. The chamber has a first side and a second side. A working fluid is contained in the chamber. The wall faces of the first and second sides are respectively formed with a first channel set and a second channel set. A first contact section and a second contact section are respectively formed at the junctions between the first and second channel sets and the wall faces of the first and second sides.

The mesh body is disposed in the chamber and attached to the first and second contact sections.

The manufacturing method of the heat pipe structure of the present invention includes steps of:
providing a tubular body and a mesh body;
forming at least one axial channel on wall face of an internal chamber of the tubular body;
placing the mesh body into the chamber;
pressing and flattening the tubular body; and
vacuuming the tubular body, filling a working fluid into the chamber and sealing the tubular body.

The heat pipe structure of the present invention has a simpler and thinner structure. Moreover, the manufacturing method of the heat pipe structure of the present invention is simplified. The mesh body serves as the capillary structure so that it is unnecessary to use the mandrel to fill the metal powder into the tubular body for forming the capillary structure. Therefore, the problem of limitation of the narrow space is eliminated. Moreover, the total thickness of the heat pipe structure is reduced and the manufacturing cost of the heat pipe structure is lowered and the ratio of good products is increased.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
FIG. 1 is a perspective sectional view of a first embodiment of the heat pipe structure of the present invention.

Please refer to FIG. 1, which is a perspective sectional view of a first embodiment of the heat pipe structure of the present invention. According to the first embodiment, the heat pipe structure 1 of the present invention includes a tubular body 11 and a mesh body 12.

The tubular body 11 has a chamber 111. The chamber 111 has a first side 111a and a second side 111b. A working fluid 2 is contained in the chamber 111. The wall faces of the first and second sides 111a, 111b are respectively formed with a first channel set 112 and a second channel set 113. A first contact section 114 and a second contact section 115 are respectively formed at the junctions between the first and second channel sets 112, 113 and the wall faces of the first and second sides 111a, 111b. The first and second channel sets 112, 113 axially extend along the wall faces of the first and second sides 111a, 111b.

The chamber 111 further has a third side 111c and a fourth side 111d. The first and second sides 111a, 111b are opposite to each other. The third and fourth sides 111c, 111d are opposite to each other and connected with the first and second sides 111a, 111b respectively. The third and fourth sides 111c, 111d are free from the first and second channel sets 112, 113.

The mesh body 12 is selected from a group consisting of knitted structure body, cellular structure body and geometrical solid structure body. The mesh body 12 is disposed in the chamber 111 in direct contact and attachment with at least one of the first and second contact sections 114, 115. Preferably, the mesh body 12 is attached to the second channel set 113 of the second side 111b. The mesh body 12 is a metal mesh or a fiber mesh.

The configuration of the channels of the first and second channel sets 112, 113 is selected from a group consisting of triangular shape, semicircular shape, cylindrical shape and Ω-shape. In this embodiment, the configuration of the channels is, but not limited to, triangular shape.

Figure 2:
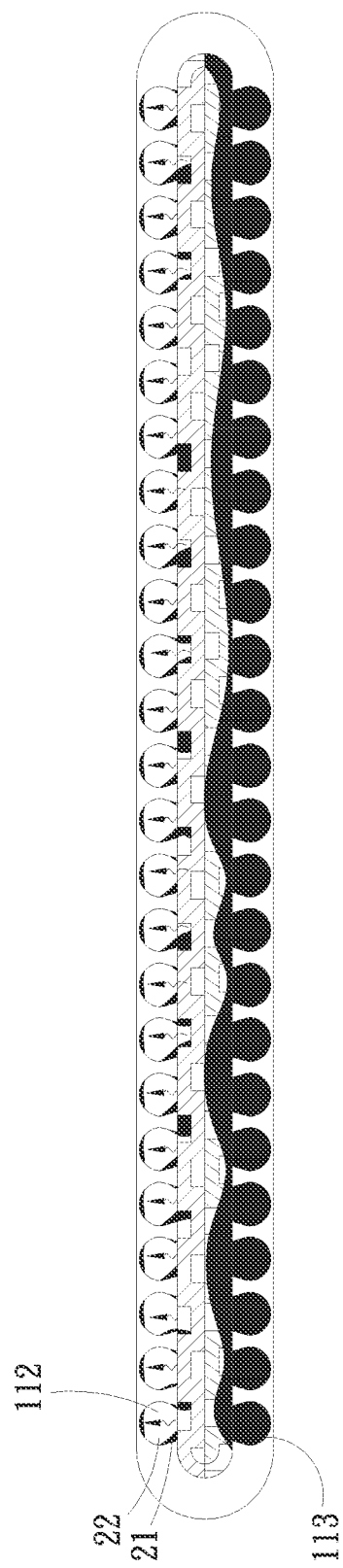
FIG. 2 is a sectional view of a second embodiment of the heat pipe structure of the present invention.

Please now refer to FIG. 2, which is a sectional view of a second embodiment of the heat pipe structure of the present invention. The second embodiment is partially identical to the first embodiment in structure and thus will not be repeatedly described hereinafter. The second embodiment is different from the first embodiment in that the configuration of the channels of the first and second channel sets 112, 113 is selected from a group consisting of semicircular shape, cylindrical shape and Ω-shape. In this embodiment, the configuration of the channels is, but not limited to, Ω-shape.

Figure 3:
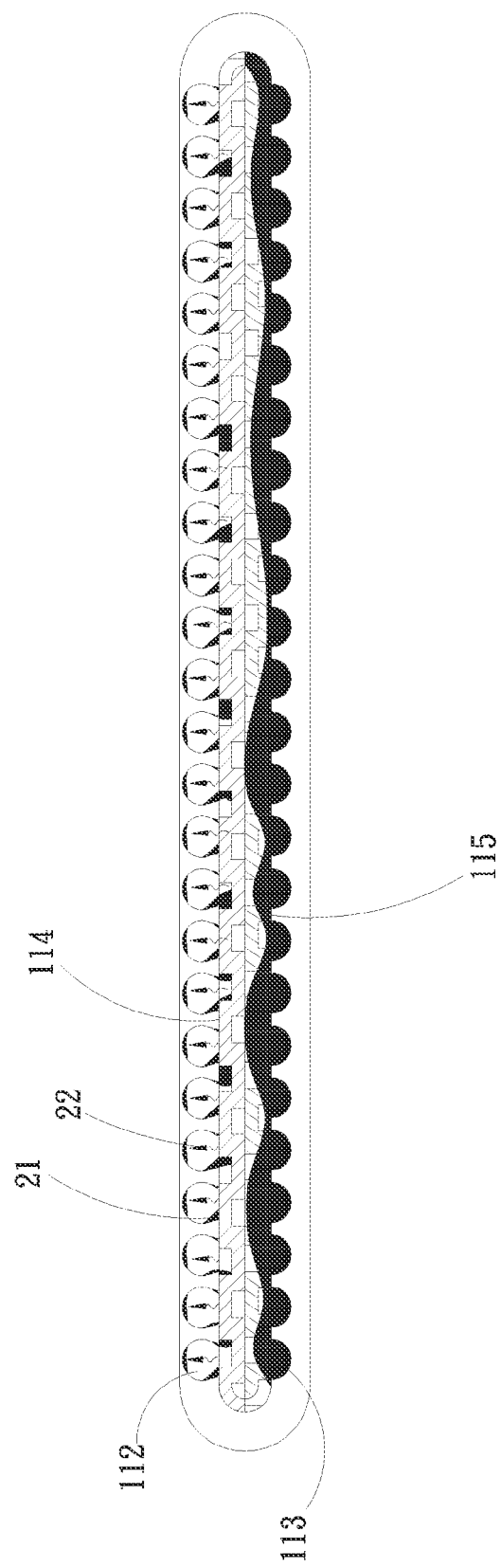
FIG. 3 is a sectional view of a third embodiment of the heat pipe structure of the present invention.

Please now refer to FIG. 3, which is a sectional view of a third embodiment of the heat pipe structure of the present invention. The third embodiment is partially identical to the first embodiment in structure and thus will not be repeatedly described hereinafter. The third embodiment is different from the first embodiment in that the configuration of the channels of the first and second channel sets 112, 113 is selected from a group consisting of semicircular shape, cylindrical shape and Ω-shape. In this embodiment, the configuration of the channels of the first channel set 112 is Ω-shape, while the configuration of the channels of the second channel set 113 is semicircular shape.

According to the first, second and third embodiments of the heat pipe structure of the present invention, the mesh body is used instead of the conventional sintered powder. This can greatly reduce the total thickness of the heat pipe to achieve thinner heat pipe. Moreover, the first channel set 112 serves as a vapor passage, while the second channel set 113 enhances the capillary attraction, whereby the efficiency of the vapor-liquid circulation is enhanced.

In addition, while being thinned, the heat pipe still keeps sufficiently large vapor passage so that the vapor-liquid circulation within the heat pipe can continuously take place without affection of the narrow space.

Also, after the liquid working fluid 21 in the chamber 111 is evaporated into vapor working fluid 22, the first channel set 112 serves as a vapor passage, whereby the vapor working fluid 22 can spread within the first channel set 112. Then the vapor working fluid 22 in the first channel set 112 or at the first and second contact sections 114, 115 is collectively condensed into liquid working fluid 21. Due to gravity, the liquid working fluid 21 drops onto the mesh body 12 and the second channel set 113 to repeat the vapor-liquid circulation.

Figure 4:
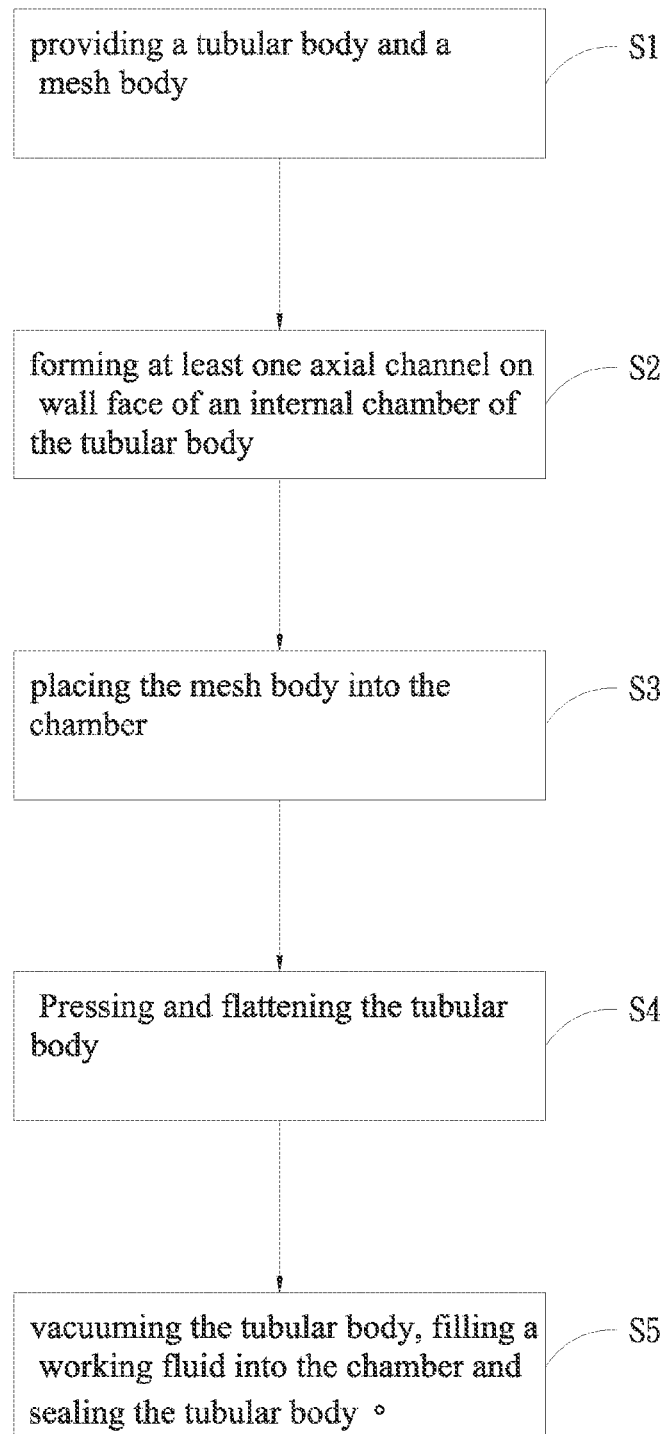
FIG. 4 is a flow chart of a first embodiment of the manufacturing method of the heat pipe structure of the present invention.

Please refer to FIG. 4, which is a flow chart of a first embodiment of the manufacturing method of the heat pipe structure of the present invention. Also referring to FIGS. 1, 2 and 3, the manufacturing method of the heat pipe structure of the present invention includes steps of:

S1. providing a tubular body and a mesh body, a hollow tubular body 11 and a mesh body 12 being provided, the tubular body 11 being a tubular body with two open ends or with at least one open end, the tubular body 11 being made of a material with good thermal conductivity, such as copper, aluminum or an alloy thereof, in this embodiment, the tubular body being made of, but not limited to, copper, the mesh body 12 being a metal mesh or a fiber mesh, in this embodiment, the mesh body 12 being, but not limited to, a metal mesh;

S2. forming at least one axial channel on wall face of an internal chamber of the tubular body, a wall face of an internal chamber 111 of the tubular body 11 being formed with at least one axial channel (first channel set 112 and second channel set 113) by means of mechanical processing;

S3. placing the mesh body into the chamber, the mesh body 12 being placed into the chamber 111 of the tubular body 11, the mesh body 12 being positioned in the chamber 111 in a fold-back state or a curled state;

S4. pressing and flattening the tubular body, the tubular body 11 with the mesh body 12 placed in the chamber 111 being pressed by means of mechanical processing until the tubular body 11 is flattened, the mechanical processing being pressing or rolling; and S5. vacuuming the tubular body, filling a working fluid into the chamber and sealing the tubular body, the flattened tubular body 11 being vacuumed and filled with a working fluid and then sealed.

Figure 5:
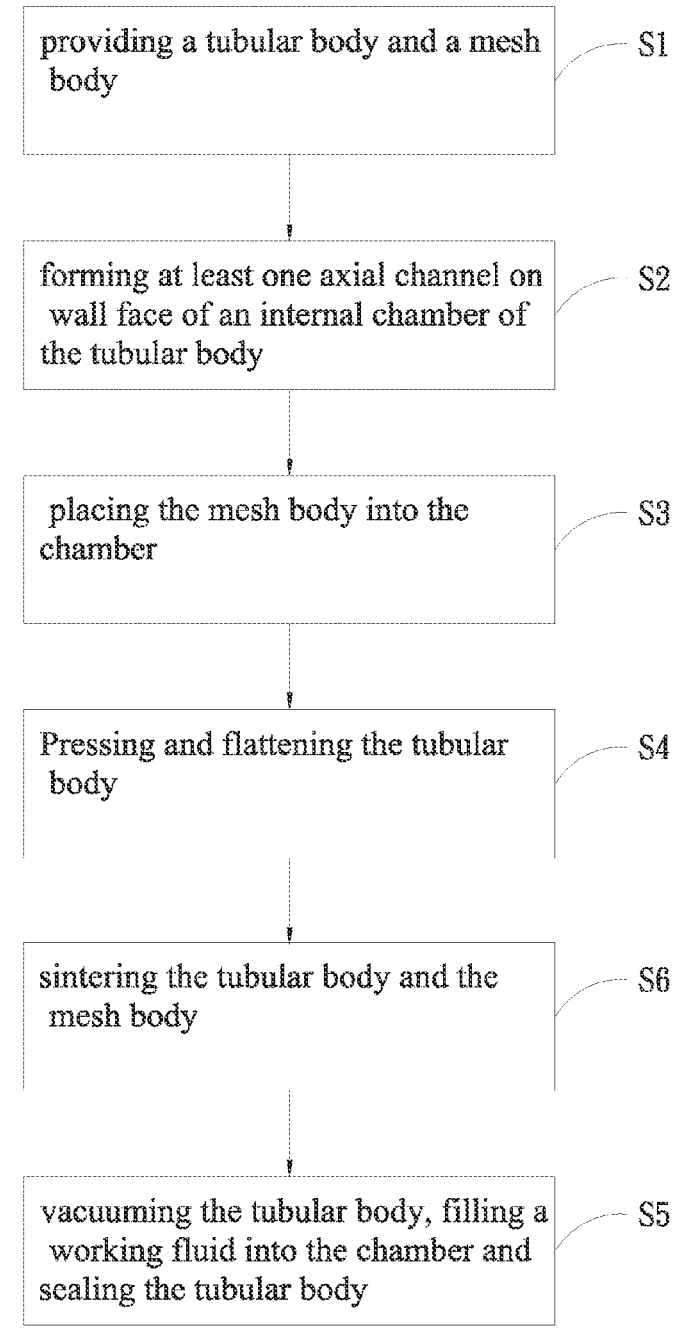
FIG. 5 is a flow chart of a second embodiment of the manufacturing method of the heat pipe structure of the present invention.

Please now refer to FIG. 5, which is a flow chart of a second embodiment of the manufacturing method of the heat pipe structure of the present invention. Also referring to FIGS. 1, 2 and 3, the manufacturing method of the heat pipe structure of the present invention includes steps of:

S1. providing a tubular body and a mesh body;

S2. forming at least one axial channel on wall face of an internal chamber of the tubular body;

S3. placing the mesh body into the chamber;
S4. pressing and flattening the tubular body; and
S5. vacuuming the tubular body, filling a working fluid into the chamber and sealing the tubular body.

The second embodiment is partially identical to the first embodiment and thus will not be repeatedly described hereinafter. The second embodiment is different from the first embodiment in that the second embodiment further includes a step S6 of sintering the tubular body and the mesh body after step S4 of pressing and flattening the tubular body.

The flattened tubular body 11 and mesh body 12 are together sintered to more tightly connect the tubular body 11 with the mesh body 12.

Figure 6:
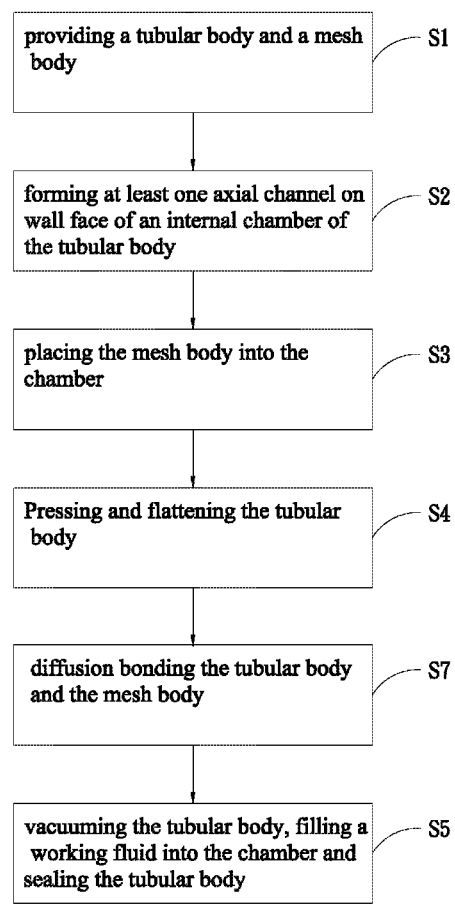
FIG. 6 is a flow chart of a third embodiment of the manufacturing method of the heat pipe structure of the present invention.

Please now refer to FIG. 6, which is a flow chart of a third embodiment of the manufacturing method of the heat pipe structure of the present invention. Also referring to FIGS. 1, 2 and 3, the manufacturing method of the heat pipe structure of the present invention includes steps of:

S1. providing a tubular body and a mesh body;
S2. forming at least one axial channel on wall face of an internal chamber of the tubular body;
S3. placing the mesh body into the chamber;
S4. pressing and flattening the tubular body; and
S5. vacuuming the tubular body, filling a working fluid into the chamber and sealing the tubular body.

The third embodiment is partially identical to the first embodiment and thus will not be repeatedly described hereinafter. The third embodiment is different from the first embodiment in that the third embodiment further includes a step S7 of diffusion bonding the tubular body and the mesh body after step S4 of pressing and flattening the tubular body.

The flattened tubular body 11 and mesh body 12 are diffusion bonded with each other to more tightly connect the tubular body 11 with the mesh body 12.

According to the manufacturing method of the heat pipe structure of the present invention, it is unnecessary to use the mandrel to fill the metal powder into the tubular body for forming the capillary structure. Therefore, the problem of limitation of the narrow space is eliminated. Moreover, the heat pipe can be thinner to reduce the total thickness of the heat pipe. Also, the manufacturing cost of the heat pipe is lowered.

The present invention has been described with the above embodiments thereof and it is understood that many changes and modifications in the above embodiments can be carried out without departing from the scope and the spirit of the invention that is intended to be limited only by the appended claims.

What is claimed is:

1. A manufacturing method of a heat pipe structure, comprising steps of:
    providing a tubular body and a mesh body;
    forming at least one axial channel on each of a top wall face and a bottom wall face of an internal chamber of the tubular body, wherein the at least one axial channel is not formed on a right wall face and a left wall face of the internal chamber of the tubular body;
    placing the mesh body into the chamber, wherein the mesh body is placed in the whole internal chamber of the tubular body, but does not extend into the at least one axial channel, and wherein a right side and a left side of the mesh body are directly in contact with and attached to the right wall face and the left wall face of the internal chamber of the tubular body, respectively;
    pressing and flattening the tubular body; and
    vacuuming the tubular body, filling a working fluid into the chamber and sealing the tubular body.

2. The manufacturing method of the heat pipe structure as claimed in claim 1, further comprising a step of sintering the tubular body and the mesh body after the step of pressing and flattening the tubular body.

3. The manufacturing method of the heat pipe structure as claimed in claim 1, wherein the wall face of the internal chamber of the tubular body is formed with the axial channel by means of mechanical processing.

4. The manufacturing method of the heat pipe structure as claimed in claim 1, wherein the tubular body is pressed and flattened by means of mechanical processing, the mechanical processing being pressing or rolling.

5. The manufacturing method of the heat pipe structure as claimed in claim 1, further comprising a step of diffusion bonding the tubular body and the mesh body after the step of pressing and flattening the tubular body.

\* \* \* \* \*